United States Patent [19]

Kaminski

[11] Patent Number: 5,400,902

[45] Date of Patent: Mar. 28, 1995

[54] UNIVERSAL COMPACT DISC STORAGE UNIT

[76] Inventor: Andrew Kaminski, 3602 Aspen Village Way, #C, Santa Ana, Calif. 92704

[21] Appl. No.: 184,841

[22] Filed: Jan. 21, 1994

[51] Int. Cl.[6] .............................................. B65D 85/57
[52] U.S. Cl. ..................................... 206/310; 206/313
[58] Field of Search ................ 206/232, 307, 309, 310, 206/311, 312, 313, 444

[56] References Cited

U.S. PATENT DOCUMENTS

| | | |
|---|---|---|
| 4,709,812 | 12/1987 | Kosterka . |
| 4,750,618 | 6/1988 | Schubert ................. 206/309 |
| 4,793,479 | 12/1988 | Otsuka et al. ........... 206/310 |
| 5,101,971 | 4/1972 | Grobecker ............. 206/310 X |
| 5,238,107 | 8/1993 | Kownacki ............... 206/310 |
| 5,251,750 | 10/1993 | Gelardi et al. ......... 206/310 |

FOREIGN PATENT DOCUMENTS

| | | |
|---|---|---|
| 429195 | 5/1991 | European Pat. Off. . |
| 3425579 | 1/1986 | Germany . |
| 3715187 | 11/1988 | Germany . |

Primary Examiner—Jacob K. Ackun, Jr.
Attorney, Agent, or Firm—Knobbe, Martens, Olson & Bear

[57] ABSTRACT

A system for storing and releasing a compact disc (CD) in storage unit, jewel box or other storage space The system includes a plurality of radially disposed clamp arms cantilevered about a raised area of a structure centrally located within a lower cover of the CD storage unit. CDs are pressed down over the clamp arms, causing detents to firmly hold the CD within the storage unit. A central button is provided for instantly releasing the CD from the insert-release system. The button actuates a crossed spring disposed below the CD. The spring includes outwardly extending legs, within which stresses are developed by pressing down on the central button prior to CD release. The central button eventually contacts the clamp arms to release the CD after stresses within the crossed spring are developed, causing the spring to pop the CD out from the insert-release system. In an alternative embodiment, the insert-release system is formed independently from a storage unit insert tray and is applied directly to the lower cover or to a cardboard liner.

10 Claims, 6 Drawing Sheets

UNIVERSAL COMPACT DISC STORAGE UNIT

FIELD OF THE INVENTION

The present invention relates to a storage system for disks and, more particularly, to an improved compact disc storage system that provides reliable clamping and instant push-button release.

DISCUSSION OF THE RELATED ART

In the recording medium industry, the ubiquitous "compact disc" has replaced most other forms in a space of only ten or so years. The term compact disc is commonly shortened to CD. CDs are made of a rigid plastic resin and have optical information encoded on one side. Typically, the flat discs have a diameter of about 120 mm with a center hole of about 15 mm in diameter to facilitate the exact mounting on a spindle of a compact disc player or read-out instrument. Scratches on the encoded side can alter, and in some cases ruin, the playback characteristics of CDs. Therefore, when not in use, CDs are usually stored in rigid plastic boxes to protect the encoded side.

Commonly used storage units for CDs, sometimes known as "jewel boxes", include an upper cover pivotally mounted on a lower cover and a CD retaining apparatus integrally formed in the center of an insert tray fastened within the peripheral edges of the lower cover. In an alternative design, CDs are held on a wide plastic tray with a central CD retaining apparatus, the tray being adhered to a folded cardboard jacket or cover. The components of CD storage units are uniformly made of molded plastic. The CD retaining apparatus generally comprises a plurality of raised cantilevered fingers separated by slits and arranged circumferentially around a central hole. The fingers are positioned in a circle slightly larger than the center hole diameter of the CD so that the CD can be pressed onto the fingers and frictionally held thereon. Unfortunately, the cantilevered fingers are subject to snapping off if too great a pressure is applied as there is no support underneath them.

The fingers form an integral part of the insert tray. Many insert trays define a circular recess for location of a CD, having diametric portions of the wall of the recess left open to provide access to the edges of the CD. Alternatively, depressions at peripheral locations around a closed circular recess are provided to insert a digit and lift the CD. In either design, to remove the CD, one must grasp the CD edge and lever upwardly to disengage the central fingers from the central throughhole of the disc. This lifting requires that the central fingers be attached to a relatively rigid insert tray. The tray must be large enough to seat firmly within the jewel box, or be grasped in the alternative cardboard cover design, to provide structure for holding the tray down while prying the CD out. The additional plastic of the tray outside of the retaining apparatus naturally adds cost and weight.

Another problem of this CD storage design is that during removal, lifting of the edges creates bending stresses within the CD, which can lead to breakage if the CD is held too tightly on the fingers. Short of outright failure of the CD, a reflective layer located just below the surface of the printed side may be deformed by the bending stresses. On the other hand, if the CD is not firmly seated on the fingers, or if the CD storage unit is inverted and subjected to vibration, CDs can be dislodged from the retaining fingers and damaged or lost. This situation is exacerbated if one or more fingers have been previously broken.

Various retaining apparatuses have been disclosed which provide a more positive holding means and which eliminate the need to lift the edges of the disc to remove from the retaining apparatus. Several of these designs show a central engagement structure molded integrally with the storage unit insert. These designs typically require the user to push downwardly in the center of the retaining apparatus to release the CD. Although this appears to be an advance over the simple frictional engagement, the designs suffer from various drawbacks, which have prevented them from being implemented on a wide scale. For example, some of the designs do not provide a limit to the travel of the central pushing portion, which might ultimately damage the molded plastic components. Another major disadvantage is the fact that the relatively complex designs greatly increase the price of specialized molds needed to form them. Another drawback of prior designs has been their inability to repeatedly and reliably release the CD upon application of varying pressures in the central region. In particular, many prior push button release apparatuses do not in fact provide a "positive" release of the CD. If the central push button remains depressed, the CD can fall back into a position where it will be retained again if the button is released. In other words, one must simultaneously use another hand to lift the CD out of the way of the retaining apparatus. Many CD users are children whose hands are not wide enough to grasp the CD in one hand, while the other hand engages a release button.

Consequently, there is a need for an improved CD storage system that overcomes the drawbacks of prior designs.

SUMMARY OF THE INVENTION

The present invention generally comprises an improved CD storage system having a push-button release mechanism therein. The push-button release system includes a plurality of clamp arms having detents, over which central throughholes of CDs are pressed so that the detents positively retain the CDs within the system. The system is integrally mounted to an insert tray placed in a CD storage unit or is adhered directly to the lower cover of the storage unit or other mounting surface.

In accordance with a preferred aspect of the present invention, the insert-release system comprises the aforementioned clamp arms, a central release button, and a cross-shaped spring disposed underneath and between the clamp arms. The clamp arms extend radially inwardly from a raised area of the system to define a cylinder, within which an intermediate shaft region of the button is disposed. The central button is free to reciprocate vertically within a limited space defined between flanges on the button. A small annular gap is formed between the clamp arms and the intermediate shaft region so that the clamp arms may shift radially inward. The lower portion of the button includes a downwardly depending boss having a conical recess on the underside which fits over a cone-shaped projection on a central junction region of the cross-shaped spring. A cavity is formed vertically underneath the central junction region of the spring so that downward depression of the button bends the junction region into the cavity. At the peripheral border of the cavity, fulcrums are formed on the outwardly extending legs of the spring, dividing the legs into outer and inner regions. Downward movement of the central junction region causes the outer region of the legs to pivot upwardly. The spring is positioned within the system so that the outer region of the legs extends upwardly through slots between clamp arms and into contact with CDs stored in the system. Ultimately, downward depression of the button causes the CDs to pop upwardly.

In one important aspect of the present invention, the detents hold the CD within the storage system until a predetermined spring tension is set up within the cross-shaped spring. In this respect, as the button is depressed, the outer regions of the legs of the spring are pivoted upwardly until the CD contacts the underside of the detents. After contact between the CD and the detents, the outer regions of the legs cannot pivot upwardly further, and downward movement of the central junction region simply builds up spring stress. After further travel of the button, an upper flange of the button contacts the upper side of the clamp arms, causing them to be biased downwardly and inwardly. The detents, being formed on the outer side of the clamp arms, are also moved inwardly to eventually release the CD. Because of the built-up spring stress, the outer regions of the legs forcefully propel the CD past the detents. This can be felt, seen, and heard instantaneously.

The present invention provides a positive release of the CD from the clamp arms. Specifically, the central button is depressed to stress the spring and then to lever the clamp arms and detents inward eventually "popping" the CD out. In fact, the upward force applied by the legs of the spring on the CD assist in levering the clamp arms inward. Thus, after the CD has forced its way upward past detents, the clamp arms spring back outward slightly into a position which prevents the CD from falling downward into the stored position again, regardless of the position of the button.

In an alternative embodiment of the present invention, the CD insert-release system is provided as a circular unit independent of an insert tray. The unit is adhered directly to a lower cover of a CD storage unit or to a paper or other material liner. Such an arrangement allows retrofitting of existing CD storage units, while also eliminating the plastic associated with the insert tray.

BRIEF DESCRIPTION OF THE DRAWINGS

FIG. 7 is a cross-sectional view of the alternative universal circular unit having the insert-release system mounted directly to a lower cover of a storage unit.

DETAILED DESCRIPTION OF THE PREFERRED EMBODIMENTS

Figure 1:
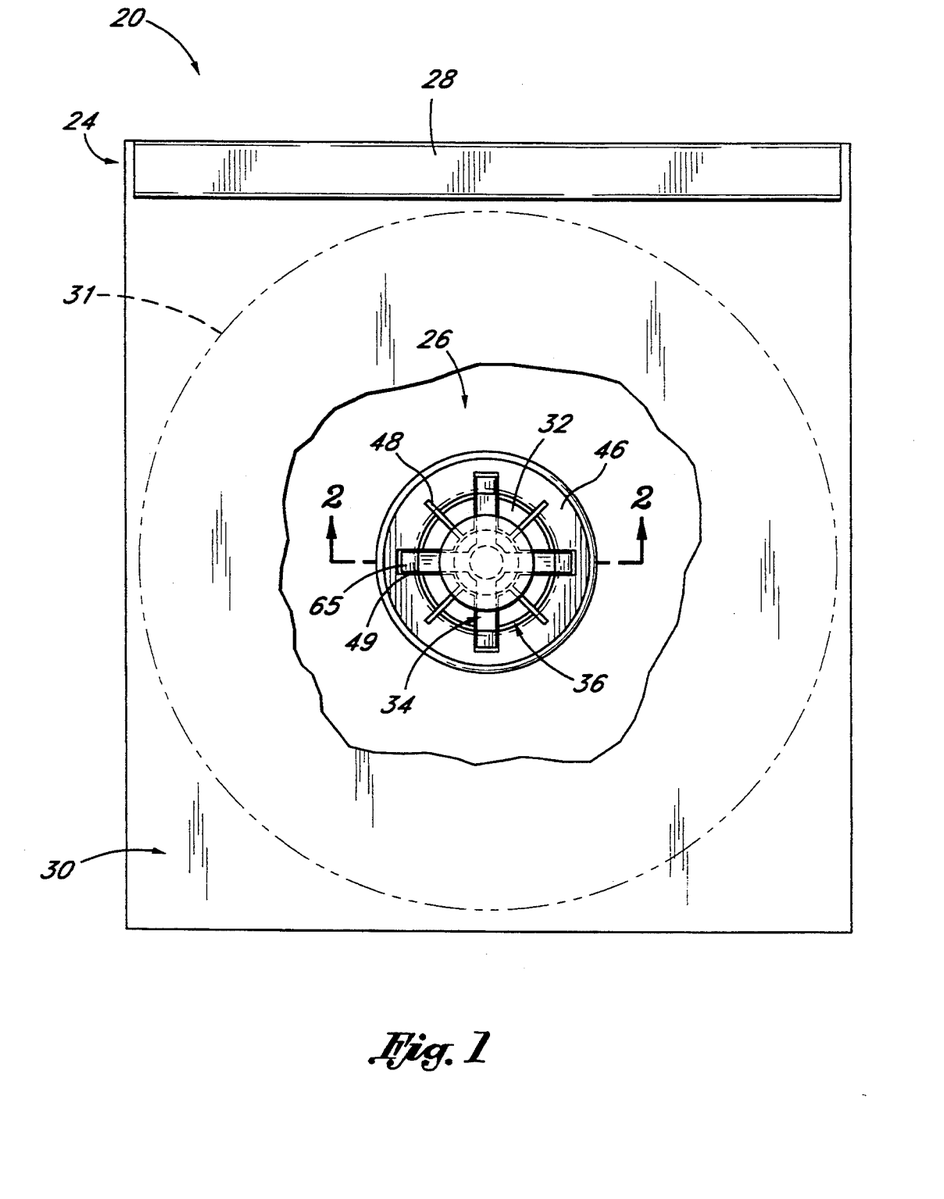
FIG. 1 is a plan view of a conventional CD storage unit, known as "jewel box", made of molded plastic with the CD insert-release system of the present invention mounted therein.

As seen in FIG. 1, the CD "jewel box" or storage unit of the present invention comprises a lower cover 22 (FIG. 2) having a hinge region 24 at one end and a central CD insert-release system 26 mounted to or integral with an insert tray 28 held within the lower cover. An upper cover 30 is pivotally mounted to the lower cover 22 at the hinge 28 region 24. The following description could apply to a tray adhered to a folded cardboard cover, in an alternative design. Furthermore, the tray 28 could conceivably be held in an "upper" cover, the present orientation being used simply as the accepted convention. In either case, the CD 31 is protectively placed with the encoded side facing the tray 28 to which the central throughhole is mounted.

A CD, shown in outline at 31, is placed over the insert-release system 26 and pressed downwardly to mount it firmly thereon, at which point the upper cover 30 is closed and the CD storage unit 20 can be transported without fear of damaging the CD. Even if the upper cover 30 is opened and the CD storage unit 20 inverted, the CD remains held firmly to the central insert-release system 26, as will be more fully understood upon reading the description below.

Now referring to FIGS. 1–4, the central CD insert-release system 26 comprises a central release button 32, a cross-shaped spring 34, and a plurality of clamp arms 36 integrally formed in the lower cover insert tray 28. The button 32 is generally bobbin-shaped, with an upper flange 38, an intermediate shaft region 40, a lower flange 42, and a bottom boss 44. The button 32 fits within the insert-release system 26 so that the intermediate shaft region 40 is positioned within a cylinder defined by the clamp arms 36. In this respect, the button 32 is free to translate vertically within the cylinder defined by the clamp arms 36 with the lower flange 42 extending outwardly a sufficient distance to retain the button within the clamp arms. Although not illustrated, the lower rim of the flange 42 may be rounded to facilitate camming past the clamp arms 36 during assembly of the button 32 into the system 26.

Figure 3:
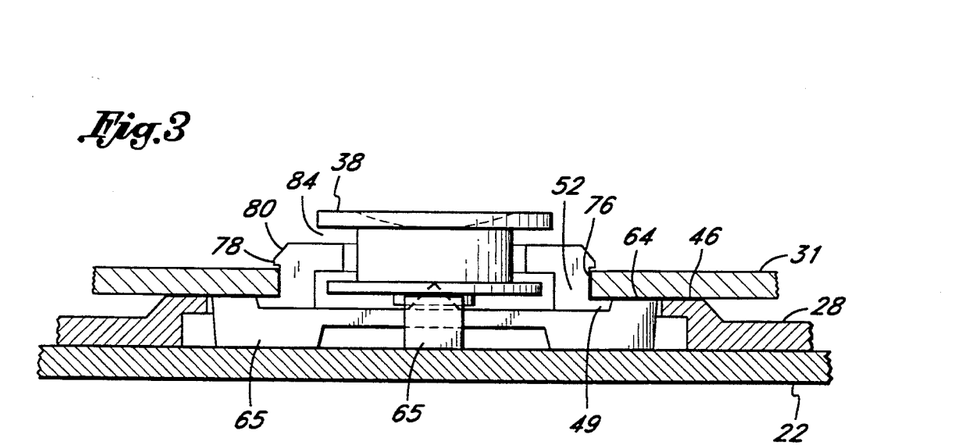
FIG. 3 is a partial cross-sectional view of the insert-release system showing a CD in a stored position.

The clamp arms 36 extend inwardly from a raised circular area 46 of the storage unit insert tray 28. The outer periphery of the raised area 46 is preferably no larger than an inner region on the lower side of the CD 31, within which no optical information is encoded. Thus, the CD 31 rests on the raised area 46, with the outer encoded portions being held above the insert tray 28, as best seen in FIG. 3.

The clamp arms 36 extend radially inwardly in generally pie-shaped configurations, with radial openings or slits 48, separating adjacent arms. Wider slots 49 are formed between some of the clamp arms 36, the slots revealing the crossed spring 34 positioned therebelow. In the preferred arrangement, the slits 48 and slots 49 alternate around the insert-release system 26 to separate the individual clamp arms 36. Each one of the clamp arms 36 is thus cantilevered about a region at which the slits 48 and slots 49 terminate around the circumference of the raised area 46. The clamp arms 36 comprise a horizontal connector portion 50, a vertical portion 52, and a radially inner finger portion 54. Radially inner faces 56 of the fingers 54 define the central cylinder surrounding the intermediate shaft region 40 of the button 32. The cylinder defined by the fingers 54 is slightly larger than the diameter of the intermediate shaft region 40 of the button 32, for reasons that will become apparent below.

Figure 4:
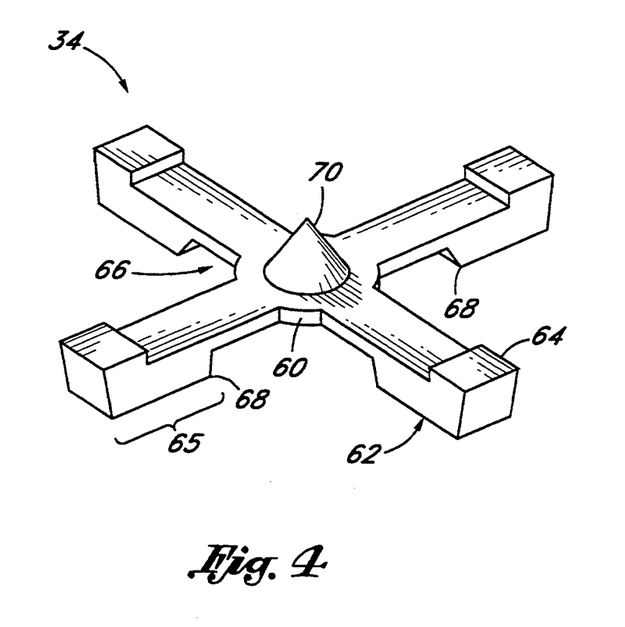
FIG. 4 is a perspective view of a cross-shaped spring of the insert-release system of the present invention.

FIG. 4 is a top perspective view of the cross-shaped spring 34. The spring 34 generally comprises a central junction region 60, with a plurality of outwardly extending legs 62 terminating in upward projections 64. The central junction region 60 and a portion of each outwardly extending leg 62 are formed thinner than the outer extremes 65 of the legs. A lower cavity 66 allows the junction region 60 and a portion of the legs 62 to define a bridge thereover. At the intersections of the outer ends 65 of the legs 62 and the cavity 66, fulcrums 68 are defined, about which the outer regions 65 pivot upon application of a downward force to the central junction region 60. In other words, if the central junction region 60 is biased downward, the outer ends 65 of the legs are raised upward. The outer legs 65 are thus defined by that portion of the legs 62 radially outward from the fulcrums 68.

Referring back to FIG. 1, the cross-shaped spring 34 is positioned underneath the clamp arms 36 so that the outwardly extending leg portions 65 may raise up through the radial slots 49. As seen best in FIG. 3, the projections 64 extend upwardly into the slots 49 in the relaxed position of the spring 34. The terminal ends of the legs 62 are preferably angled so that the spring can be closely centered within the raised area 46 to avoid looseness of assembly and still avoid making contact with the raised area upon being pivoted upward. The projections 64 are thus positioned in contact with the lower surface of the CD 31. In the preferred embodiment, there are four such outwardly extending legs 62, but it is contemplated that only three or, alternatively, more than four may be used. Within the quadrants between outwardly extending legs 62, two clamp arms are separated by a slit 48, thus requiring a total of four slits and eight clamp arms. Other configurations are possible.

The spring central junction region 60 has an upwardly pointing right circular cone 70 formed thereon. The cone 70 is sized to fit within a right circular conical depression 72 in the underside of the bottom boss 44 of the release button 32. The interaction of the cone 70 and recess 72 centers the button 32 within the CD insert-release system 26 and over the junction region 60 of the spring 34. The base of the cone 70 may is slightly larger than the opening of the conical depression 72 so that a small gap (not numbered) is formed between the boss 44 and junction region 60. This further ensures the button 32 will be centered above the spring 34 at all times.

The release button 32 thus comprises an actuator for depressing the thin junction region 60 to cause the outwardly extending legs 65 to pivot upwardly so that the projections 64 contact and raise the CD. The cone 70 and depression 72 interact to center the button 32 within the cylinder created by the inner faces 56 of the clamp arms 36. As an alternative, the lower surface of the lower boss 44 maybe glued or otherwise attached to the upper center of the spring 34 to provide this alignment. In this embodiment, the button 32 and spring 34 would be adhered together and then inserted into the insert release system 26 as a single component, the lower flange 42 retaining this combined unit therein.

Figure 2:
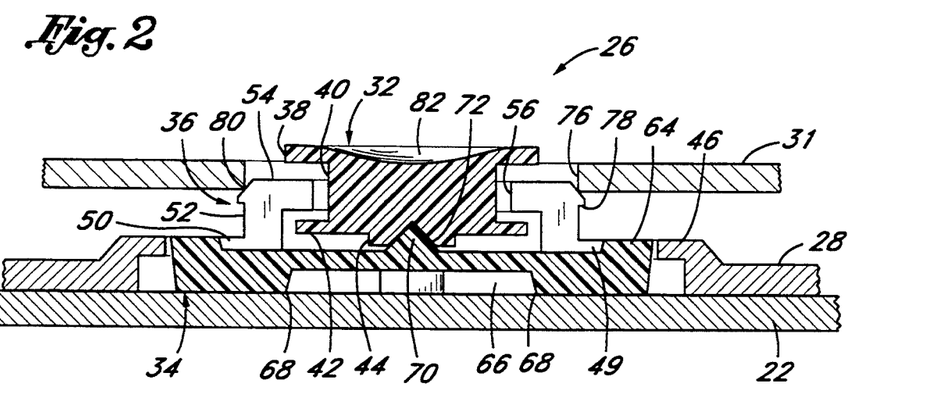
FIG. 2 is a cross-sectional view along line 2—2 of FIG. 1, showing the elements of the insert-release system with a CD in a position prior to storage.

With specific reference to FIG. 3, a CD 31 is shown stored in the insert-release system 26 of the present invention. The inner throughhole 76 of the CD 31 is sized to fit around a cylindrical region defined by the outer surfaces of the vertical portions 52 of the clamp arms 36. At the upper end of the vertical portions 52, detents 78 are formed in the clamp arms 36 to securely retain the CD 31 therein. The detents 78 are preferably formed in the shape of horizontal ledges but may also assume other shapes. In order to insert a CD 31 into the insert-release system 26, the central throughhole 76 is simply placed over the clamp arms 36, as seen in FIG. 2, which are provided with chamfers 80 to guide the CD centrally thereover. A chamfer (not shown) may be provided on the upper rim of the flange 38 to help guide the CD as well. Upon downward motion of the CD 31, the clamp arms 36 are biased inwardly due to their cantilevered connection to the raised area 46 of the insert tray 28. After the CD 31 has been pressed downwardly so that its upper surface passes the detent 78, the clamp arms 36 spring outwardly to lock the CD in place. FIG. 3 shows a CD 31 stored in the insert-release system 26 and all elements in a relaxed mode.

In order to release a CD 31 from the insert-release system 26, a user simply presses on the top of the central button 32 until the CD "pops" out. The release button 32 is provided with a central cavity 82 in its upper surface to facilitate manipulation. This preferred arrangement is simple and reliable, regardless of how much downward force is applied. Indeed, the system 26 includes built-in stops, which prevent a user from overly stressing the components therein by pressing down too hard. Specifically, the button 32 can only be pressed downward until the lower surface of the central junction region 60 of the spring 34 contacts the upper surface of the lower cover 22 of the storage unit. Furthermore, the outwardly extending upper flange 38 protects the individual clamp arms 36 from random impact at all times.

Figure 5:
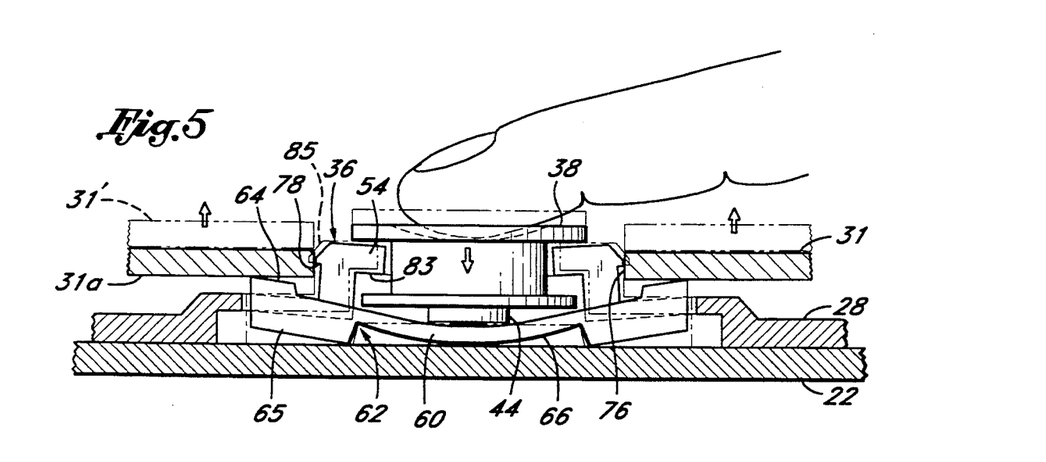
FIG. 5 is a partial cross-sectional view of the insert release system showing a CD being released from the system.

Now with reference to FIG. 5, to release a CD 31 captured within the insert-release system 26 the central button 32 is depressed causing the lower boss 44 to force the junction region 60 of the cross-shaped spring 34 downwardly. The junction region 60 being forced downwardly into the cavity 66 causes the outwardly extending legs 65 to be levered upward, thus applying an upward force from the projections 64 to the lower surface 31a of the CD proximate the central throughhole 76. After a short upward travel, the CD 31 reaches the ledge-shaped detents 78, which halt any further upward movement. As the central button 32 is depressed further, spring stresses are set up within the cross-shaped spring 34 as the junction region 60 is forced downwardly into the cavity 66 against the material resistance of the spring legs 62. At a certain point, the upper flange 38 of the central button 32 reaches the upper surface of the clamp arm fingers 54 and begins bending the clamp arms 36 down and in. After still further pressing on the central button 32, the clamp arms 36 are bent inwardly far enough so that the CD 31 forces its way past the detents 78 due to the upward force applied by the spring legs 62. Because of the spring-stresses developed within the crossed spring 34, the outwardly extending legs 65 and projections 64 forcefully propel the CD 31 upwardly past the detents 78. Of course, with such small dimensioned parts, the propulsive effect of the stressed legs 62 simply causes the CD 31 to pop up above the detents 78 and fall back down to land on the chamfered regions 80. The user feels a sensory click and hears the CD 31 pop upward, while at the same time seeing the CD being released. All these actions take place instantaneously due to the small size of the components.

With specific reference to FIG. 5, the central button 32 is shown in its fully depressed position. That is, the lower boss 44 is contact with the upper surface of the central junction region 60 of the spring 34 which, in turn, is in contact with the lower cover 22. In this position, the upper flange 38 can levered the clamp arms 36 down and inward only far enough to reduce the restraining structure holding the CD 31 in the stored position. At this point, or shortly before this position is reached, the upward force on the CD 31 is great enough to come into play and force the CD upward, bending the clamp arms 36 inward still further, to the position shown by solid line 83. It can be seen that a small space is created between the clamp arm 36 and the lower surface of the flange 38. After the CD 31 continues past the detent 78, the clamp arms 36 spring back outward to the dashed outline position 85. The return of a clamp arm 36 to this outward position, prevents the CD 31, as shown in dashed outline 31', from then falling back downward into the stored position if the central button 32 remains depressed. This arrangement provides a "positive" release system which only requires one hand to operate and is guaranteed to release the CD every time the button is pressed.

In another possible configuration, the upper flange 38 may have a smaller diameter than shown, may be eliminated altogether or may be raised upward to prevent it from contacting the clamp arms 36. In this configuration, the detents 78 are rounded or angled so that upon sufficient generation of spring stress within the spring 34, the CD 31 could cam upward past the detents without the help of the flange 38. In this non-illustrated embodiment, the detents would have to be sufficiently sized to resist an initial upward force from the spring legs 62 through the CD 31. After a predetermined spring stress has been developed within the spring 34, further pressing of the button would "pop" the CD 31 upward over the detents, in accordance with the principles of the primary embodiment. As a general upper size limit for the detents 31, the CD 31 would reliably be released from the insert-release system 26 at least at the point the button 32 reached its maximum downward travel.

The present invention has many possible embodiments, the particular dimensions and materials not being critical to an understanding of the universal CD storage unit. For example, the cross-shaped spring 34 may assume various sizes and be manufactured from a variety of materials having spring qualities. The spring may be readily fabricated in molds and be made of various plastic or other synthetic materials or may be machined from a suitable metal. Desirably, however, the spring 34 is molded using one of the following plastics: acrylic, polycarbonate, Delryn®, or polyester. As general guidelines, the material properties of the spring must include a sufficient elasticity, and also a toughness that can withstand repeated bending.

As far as the dimensions of the components, the central raised area 46 must be smaller in diameter than the inner nonencoded region of the CD, while the vertical portions 52 of the clamp arms 36 must form a cylindrical surface, which is equal to or slightly smaller than the inner diameter of the throughhole 76. The vertical portions 52 must be at least as tall as the thickness of the CD 31. The finger portions 54 of the clamp arms 36 extend inward to form the aforementioned cylinder surrounding the intermediate shaft region 40 of the button 32, while allowing a predetermined space therebetween for the clamp arms 36 to move inwardly. Specifically, the space formed between the radial faces 56 and the intermediate shaft region 40 must be sufficient to allow the clamp arms 36 to bend inwardly and downwardly to allow the CD 31 to be released by the detents 78.

The spring force generated by the spring 34 must be sufficient to "pop" the CD 31 upwardly once the clamp arms 36 are biased inwardly. The upward force of the projections 64 on the underside of the CD 31 is determined by a number of factors, primary among those being the diameter of the cavity 66 and the total length of the outwardly extending arms 62 as well as the material properties. As the outer region 65 of each leg 62 pivots about the fulcrum 68, the vertical height change of the projection 64 is determined by the lever arm about the fulcrum. The lever arm of the outer region is longer for longer legs 62 with the cavity 66 diameter being constant, while the lever arm is shorter for wider cavities and the leg length remaining constant.

The amount of upward force generated by the spring 34 on the lower surface 31a of the CD is also dependent on the distance the central junction region 60 is depressed. Initially, a space 84 (FIG. 3) is formed between the upper flange 38 and the clamp arm fingers 54. As the button 32 is depressed, the CD may raise up a small amount to contact the underside of the detent 78, after which the remaining distance between the upper flange 38 and fingers 54 is the distance the central junction region 60 is depressed without further upward movement of the projection 64. The cavity 66 must be large enough to receive this downward movement of the junction region 60. Upon contact between the upper flange 38 and fingers 54, the clamp arms 36 are quickly biased inwardly to release the CD and allow the spring tension set up within the spring 34 to "pop" the CD upwardly. All of these dimensions are carefully balanced to provide an optimum insert-release system 26, which allows the user to pop up the CD with minimal force applied, yet ensure that the CD is released each and every time.

Figure 6:
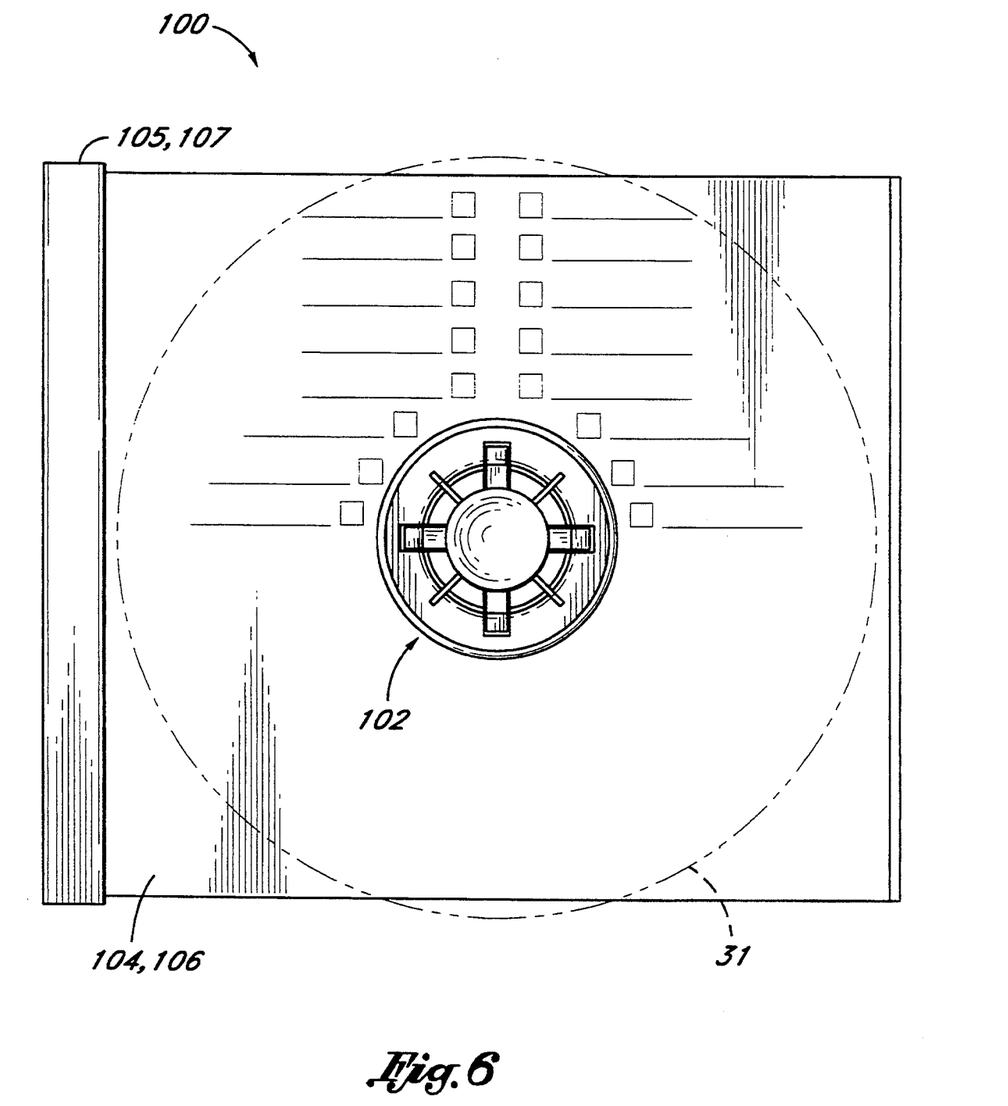
FIG. 6 is a plan view of an alternative universal circular unit having the insert-release system mounted to a paper or other material liner within a storage unit.
Figure 8:
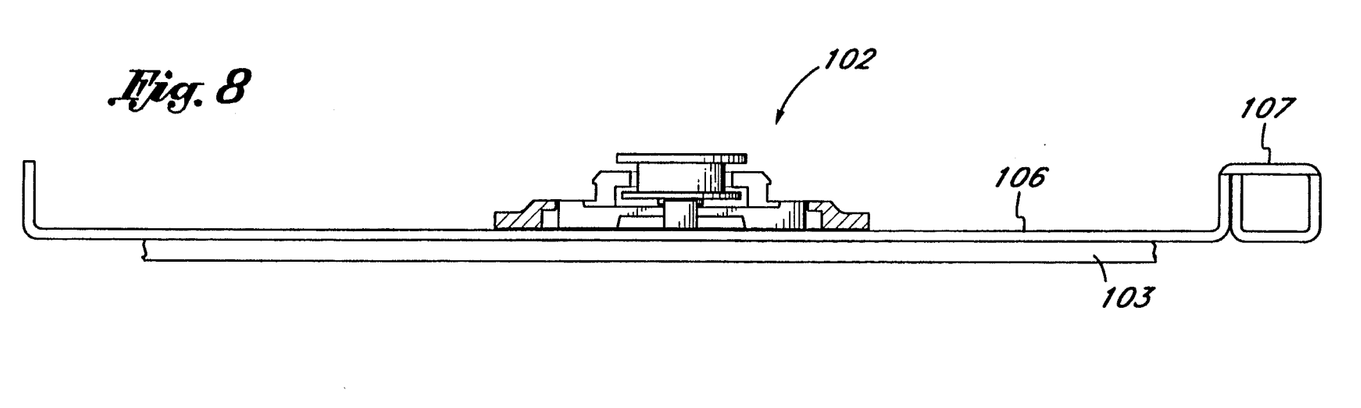
FIG. 8 is a cross-sectional view of the alternative universal circular unit having the insert-release system mounted directly to a storage unit liner.

Now with reference to FIGS. 6-8, an alternative CD storage system 100 is shown. The storage system 100 comprises an identical central insert-release system 102 to the insert-release system 26 described above. The basic difference between the embodiments is that the insert-release system 102 comprises an autonomous universal circular unit having a mounting base which can be applied to a number of different surfaces, rather than being formed integrally with an insert tray. In the embodiment of FIGS. 1-5, the insert-release system 26 is formed by components positioned within the clamp arms 36, which are formed integrally with the insert tray 28. In the alternative embodiment of FIGS. 6-8, however, the insert-release system 102 can be glued or otherwise secured directly to a lower cover 103 of a CD storage unit 20 or the upper cover or to a sheet of paper, cardboard, or other material 104, 106 within either cover. Furthermore, the system 102 may be adhered to any suitably flat surface, such as, for example, a computer housing, a table, etc. In this respect, the element 103 is intended to represent the cover shown or a more substantial article.

The autonomous universal circular unit having an insert-release system 102 provides numerous freedoms not previously associated with CD storage units. For example, the system 102 may be mounted on much more flexible surfaces, such as paper or cardboard, than was possible previously. This greatly reduces the amount of plastic required which is manifested in substantial raw material and manufacturing cost savings. Further, the elimination of this excess plastic provides immediate environmental benefits, not only in the reduction of post-consumption solid waste, but in lower energy and resources expended during manufacturing.

In the particular embodiment shown in FIG. 7, the central insert-release system 102 is secured to a lower cover 22 by a suitable adhesive. A cardboard tray 104 having a central aperture through which the insert-release system 102 projects is placed within the lower cover 22. The cardboard tray 104 fits closely within the lower cover around the insert-release system 102 and typically includes a rectangular region 105 comprising a flap folded upon itself and glued. By adhering the insert-release system 102 directly to the lower cover 22, the surrounding plastic of the insert tray 28 is eliminated. This is a great advantage in cost and weight savings over prior designs. Indeed, in the mail order industry, such weight savings translate into direct profit increases from decreased postage expenses.

As shown in FIG. 8, the central insert-release system 102 can be adhered directly to a cardboard tray 106. The specific means for securing the system 102 to the tray 106 may be varied, with glue or epoxy being particularly convenient. The cardboard tray 106 is then simply placed within or adhered to the lower cover 22 and typically includes a rectangular region 107 comprising a flap folded upon itself and glued. Such an arrangement was not possible with prior CD storage unit designs, which necessitated substantial prying of the CDs to remove them from the central retaining assembly. As the present invention includes a central push-button release, a rigid peripheral support is no longer needed. Furthermore, providing a paper or cardboard liner surrounding the central insert-release system 102 allows the user to write directly thereon, which was not previously possible with plastic insert trays as depicted in FIG. 6. Thus, specific song titles, reprinted art, graphics or list or sequence of data can be indicated on the cardboard trays 104, 106. Also, personal messages can be recorded, and the CD storage system 100 given as a personalized gift. The area of song titles, reprinted art, graphics, personal annotations, etc., is radially outward of the circle defined by the insert-release system 102.

Figure 9:
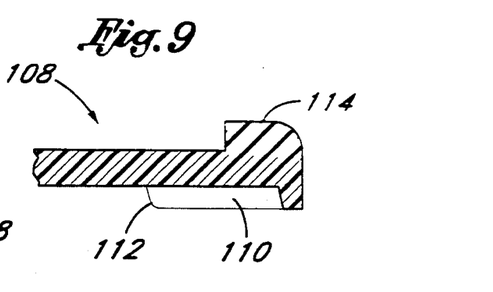
FIG. 9 is a top plan view of an insert-release system of the present invention having an alternative spring shape.
Figure 9A:
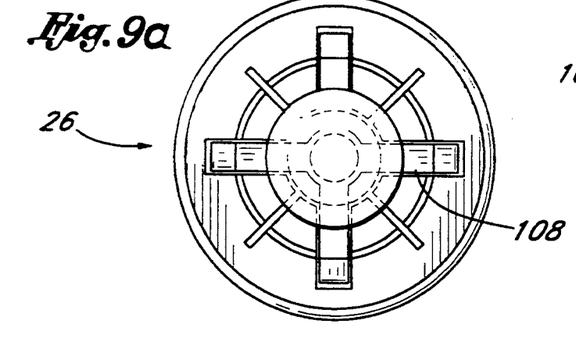
FIG. 9a is a cross-sectional view of an outer leg region of the alternative spring of FIG. 9.

FIGS. 9-12 show various cross sections possible for the spring legs 62. In FIGS. 9 and 9a, a central elongated cavity 110 formed on the underside of the outer region of an alternative leg 108. The cavity 110 thus reducing the amount of material required for the spring while maintaining a virtually identical level of rigidity as the solid legs 62 shown in the former embodiments. In addition, a radius 112 is formed at the fulcrums of the outer region 65 to provide a smoother operation. The outer corner of the projection 114 is rounded.

Figure 10:
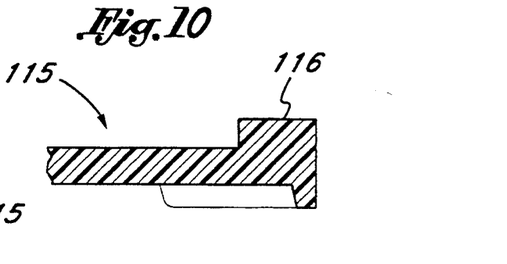
FIG. 10 is a top plan view of an insert-release system of the present invention having an alternative spring shape.
Figure 10A:
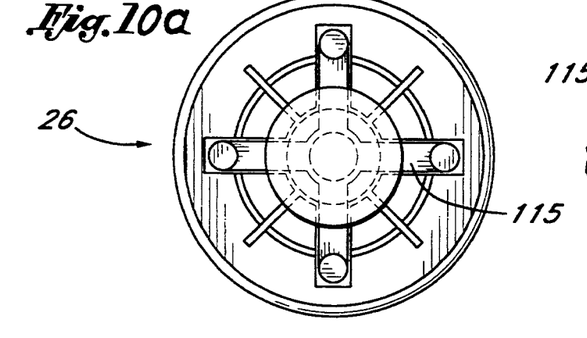
FIG. 10a is a cross-sectional view of an outer leg region of the alternative spring of FIG. 10.

FIG. 10 illustrates a further cross sectional view of an alternative leg 115, similar to the leg 108 of FIG. 9 but having a differently shaped projection 116. The cylindrical projection 116 is also shown in a plan view in FIG. 10a.

Figure 11:
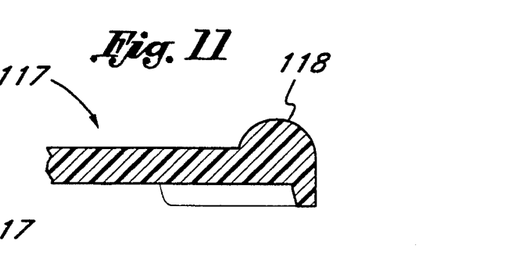
FIG. 11 is a top plan view of an insert-release system of the present invention having an alternative spring shape.
Figure 11A:
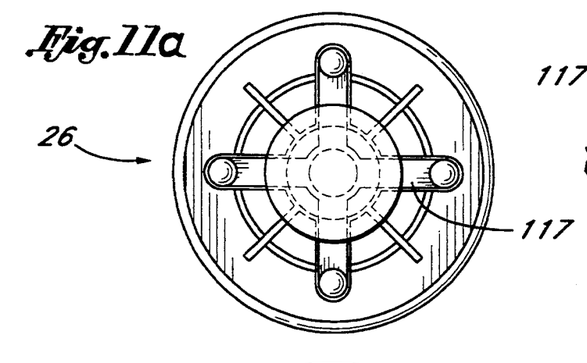
FIG. 11a is a cross-sectional view of an outer leg region of the alternative spring of FIG. 11.

FIGS. 11 and 11a show still another version of a leg 117 similar in all aspects to the leg 108 of FIG. 9 but having a spherically shaped projection 118.

Figure 12:
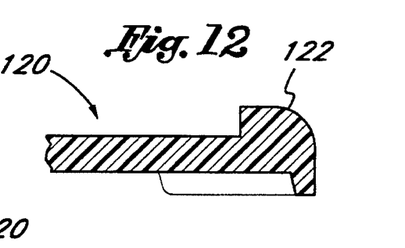
FIG. 12 is a top plan view of an insert-release system of the present invention having an alternative spring shape.
Figure 12A:
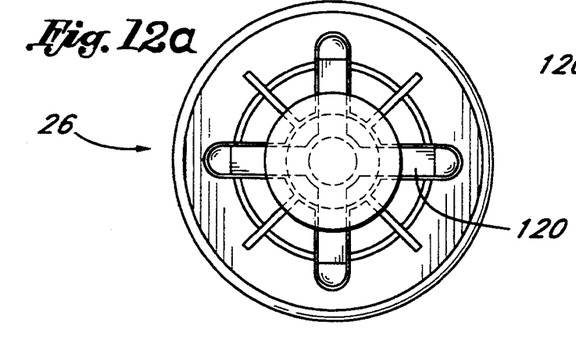
FIG. 12a is a cross-sectional view of an outer leg region of the alternative spring of FIG. 12.

And finally, FIGS. 12 and 12a show still another version of a leg 120 similar in all aspects to the leg 110 of FIG. 9 but having a hemi-spherically shaped projection 122.

The alternative construction of the legs 110, 115, 117 and 120 described above eliminate material from the initial embodiment of the spring 34 shown in FIGS. 1-5, while maintaining a nearly identical performance. This is preferred as it substantially reduces the manufacturing costs and conserves resources to help preserve our environment.

Although this invention has been described in terms of certain preferred embodiments, other embodiments that are apparent to those of ordinary skill in the art are also within the range of this invention. Accordingly, the scope of the invention is intended to be defined only by reference to the following claims.

I claim:

1. A retainer assembly for a compact disc having a hole in the center, the assembly comprising:
   a support including a raised area sized to extend beneath portions of the disc around the central hole;
   a plurality of circumferentially spaced clamp arms having radially inner, free ends defining a central cylindrical region, said arms having radially outer portions joined to said raised area so that the clamp arms are supported in cantilever fashion, said arms having inner vertically extending portions defining a cylinder having a diameter smaller than the disc central hole, said vertical portions including radially outwardly extending detents defining a circle larger than said hole that retain the disc on the clamp arms, said clamp arms being made of a material that enable the arms to be flexed downwardly so that the detents can be moved inwardly into a position where they no longer retain the disc;
   a depressible central release button positioned and retained within said cylindrical region, the button having a shaft region positioned loosely within the cylindrical region; and
   a spring positioned below the release button having a central bridge area supporting the button and having a plurality of outer regions supporting the bridge area over a space, the spring having sufficient elasticity so that downward movement of the bridge area will cause upper outer portions of the spring to pivot upwardly, the upper outer portions being positioned in slots between the clamp arms, said retainer assembly having a first position in which said central release button is undepressed, said detents retain the disc on the clamp arms, and said spring is in an unflexed position, said retainer assembly having a second position wherein said central release button has been depressed a first distance, said detents still retain the disc on the clamp arms, and said spring is flexed a predetermined amount to urge said outer portions upwardly against lower surface portions of the disc, and said retainer assembly having a third position wherein said central release button has been depressed a second distance greater than said first distance, and said spring releases its stored energy all at once, causing said spring outer portions to pop said disc above said detents.

2. The assembly of claim 1, wherein said clamp arms include radially inwardly extending fingers positioned at the upper ends of said vertical portions, the inner surfaces of said fingers defining said cylindrical area which surrounds said shaft cylindrical region.

3. The assembly of claim 2, wherein said button includes a lower flange which fits within the area defined by the inner surfaces of said clamp arm vertical portions, the outer diameter of said lower flange being larger than the inner cylindrical region defined by the inner surfaces of said clamp arm fingers so that the button lower flange is captured between the clamp arm fingers and the spring.

4. The assembly of claim 1, wherein said support comprises an insert tray having a periphery larger than the diameter of a compact disc stored in said retainer assembly.

5. The assembly of claim 1, wherein said support comprises a circular mounting base having a diameter smaller than a compact disc.

6. The assembly of claim 5, wherein said circular mounting base is adhered to a flexible element of a material suitable for receiving pre-printed information or for writing directly thereon.

7. The assembly of claim 1, wherein said button includes an upper flange having a periphery larger than said central cylindrical region formed by said clamp arms, said button being sized so said upper flange does not contact said clamp arms in said first or second positions, and wherein further depressing said release button into said third position causes said upper flange to contact and flex said clamp arms.

8. The assembly of claim 1 wherein in the third position of said retainer assembly the detents define a circle larger than the disc hole but said spring stored energy causes the disc to push the detent temporarily inwardly, and the resiliency of the clamp arms thus causes them to flex outwardly so that the detents again define a circle larger than the hole.

9. A method of retaining and releasing a disc on clamp arms extending through a central opening in the disc comprising:
   positioning the disc on upwardly extending portions of a plurality of circumferentially spaced clamp arms that extend radially inwardly in cantilever fashion from support structure surrounding the clamp arms;
   retaining said disc on said portions by detent surfaces extending radially outward on said clamp arms;
   depressing a release button positioned within a cylindrical area defined by the clamp arms a first distance to depress a central bridge portion of a spring positioned beneath the release button to cause outer upper regions of said spring to pivot upwardly and push against lower surface portions of the disc surrounding its central opening to urge the disc upwardly against said detent surfaces on the clamp arms; and
   depressing said release button a second distance greater than the first distance to depress said spring bridge portion further and cause a flange on the button to flex the clamp arms inwardly to release the disc from the detent surfaces on the clamp arms to cause the disc to pop upwardly as it is released from said clamp arms.

10. A compact disc storage system for retaining a compact disc having central throughhole comprising:
    a plurality of circumferentially spaced, inwardly directed clamp arms cantilevered about a peripheral raised area, detents extending outwardly from vertical portions of said clamp arms, the vertical portions defining a cylinder with a diameter approximately equal to a diameter of the central compact disc throughhole so that a compact disc can be pressed onto said clamp arms past said detents to a stored position resting on said raised area;
    a central release button being positioned and retained within a cylindrical region defined by the clamp arms, the button including a shaft region positioned within the radially inner surfaces of the clamp arms; and
    a spring positioned below the release button having a central bridge area and a plurality of outer regions supporting the bridge area over a space, the spring having sufficient elasticity so that downward movement of the bridge area will cause the outer regions to pivot upwardly about fulcrums, the outer regions of the spring being positioned in slots in the raised area below a compact disc in the stored position, the detents being of a sufficient size to resist upward motion of the compact disc upon application of a first downward force on the release button, said first downward force sufficient to develop a spring stress within said spring yet insufficient to release said disc from said detents, and wherein a second downward force greater than said first force on the release button is sufficient to force the compact disc upwardly, camming said detents inwardly.

* * * * *

UNITED STATES PATENT AND TRADEMARK OFFICE
CERTIFICATE OF CORRECTION

PATENT NO. : 5,400,902
DATED : March 28, 1995
INVENTOR(S) : Andrew Kaminski

It is certified that error appears in the above-indentified patent and that said Letters Patent is hereby corrected as shown below:

Title page, item [57],
In the Abstract, line 2, after "space" insert --.--.

Column 4, line 30, after "storage" insert --20--.

Column 4, line 37, delete "28".

Column 6, line 5, delete "may".

Column 7, line 67, change "31" to --78--.

Column 9, lines 37, 40 and 44, change "22" to --103--.

Signed and Sealed this

Eleventh Day of July, 1995

*Attest:*

BRUCE LEHMAN

*Attesting Officer*  *Commissioner of Patents and Trademarks*